J. E. STYERS.
AUTOMATIC SPEED CHANGING MECHANISM.
APPLICATION FILED FEB. 19, 1917.
1,291,241.
Patented Jan. 14, 1919.
3 SHEETS—SHEET 2.
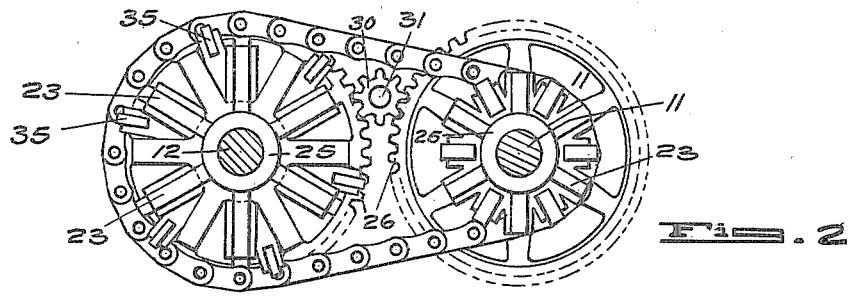
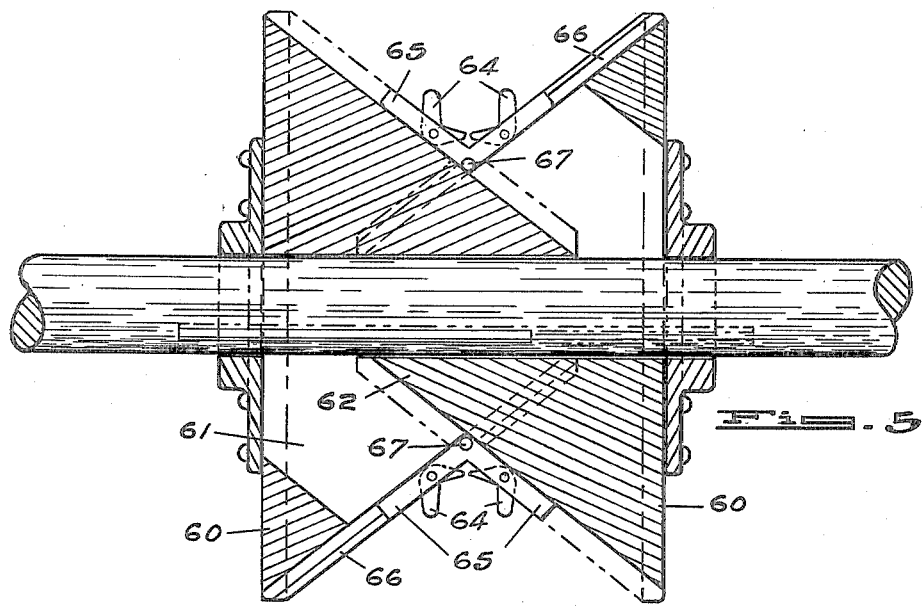
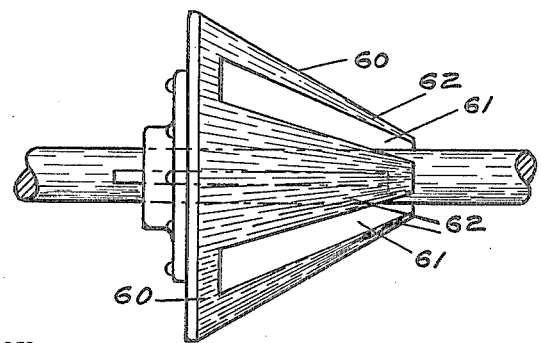
WITNESSES:
F. C. Matheny
W. W. Boulton
INVENTOR
JOHN E. STYERS
BY
Cook & Matheny
ATTORNEY J. E. STYERS.
AUTOMATIC SPEED CHANGING MECHANISM.
APPLICATION FILED FEB. 19, 1917.
1,291,241.
Patented Jan. 14, 1919.
3 SHEETS—SHEET 3.
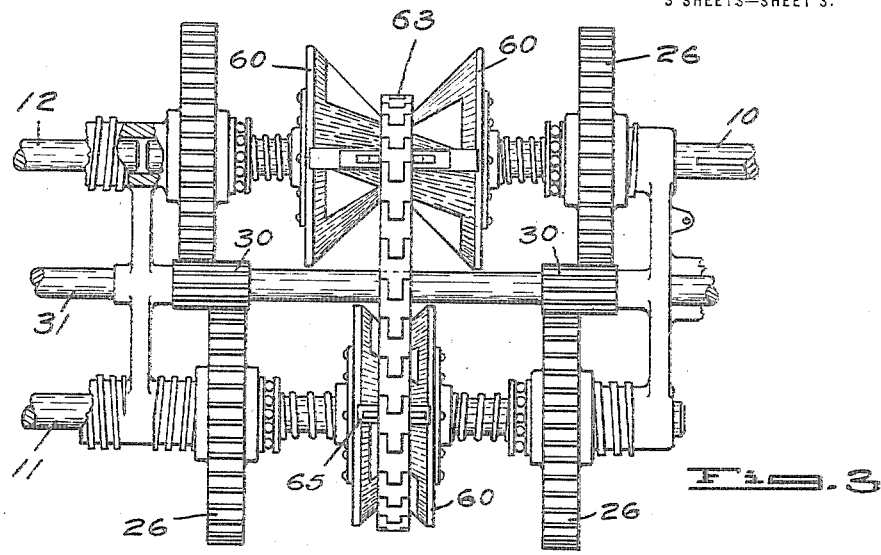
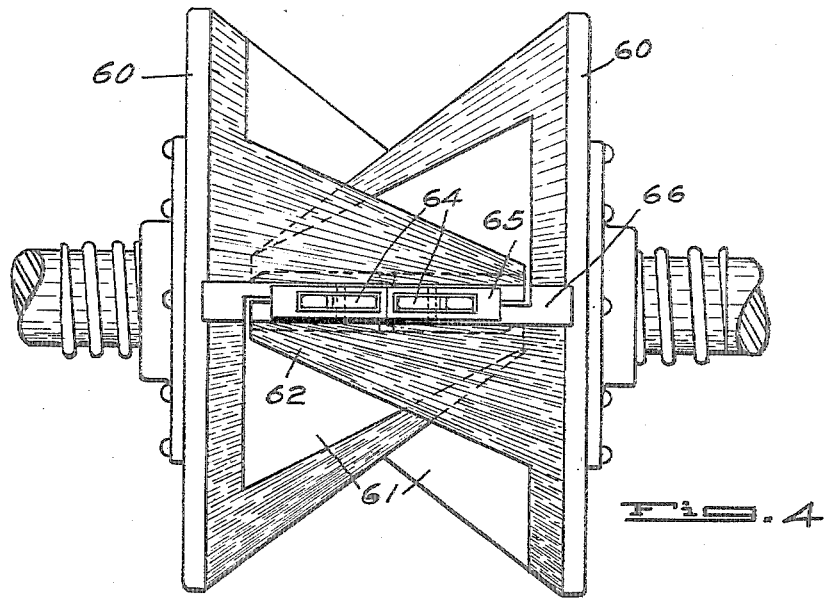
WITNESSES:
F. C. Matheny
W. W. Boulton
INVENTOR
JOHN E. STYERS
BY
Cook & Matheny
ATTORNEY ically pointed
UNITED STATES PATENT OFFICE.

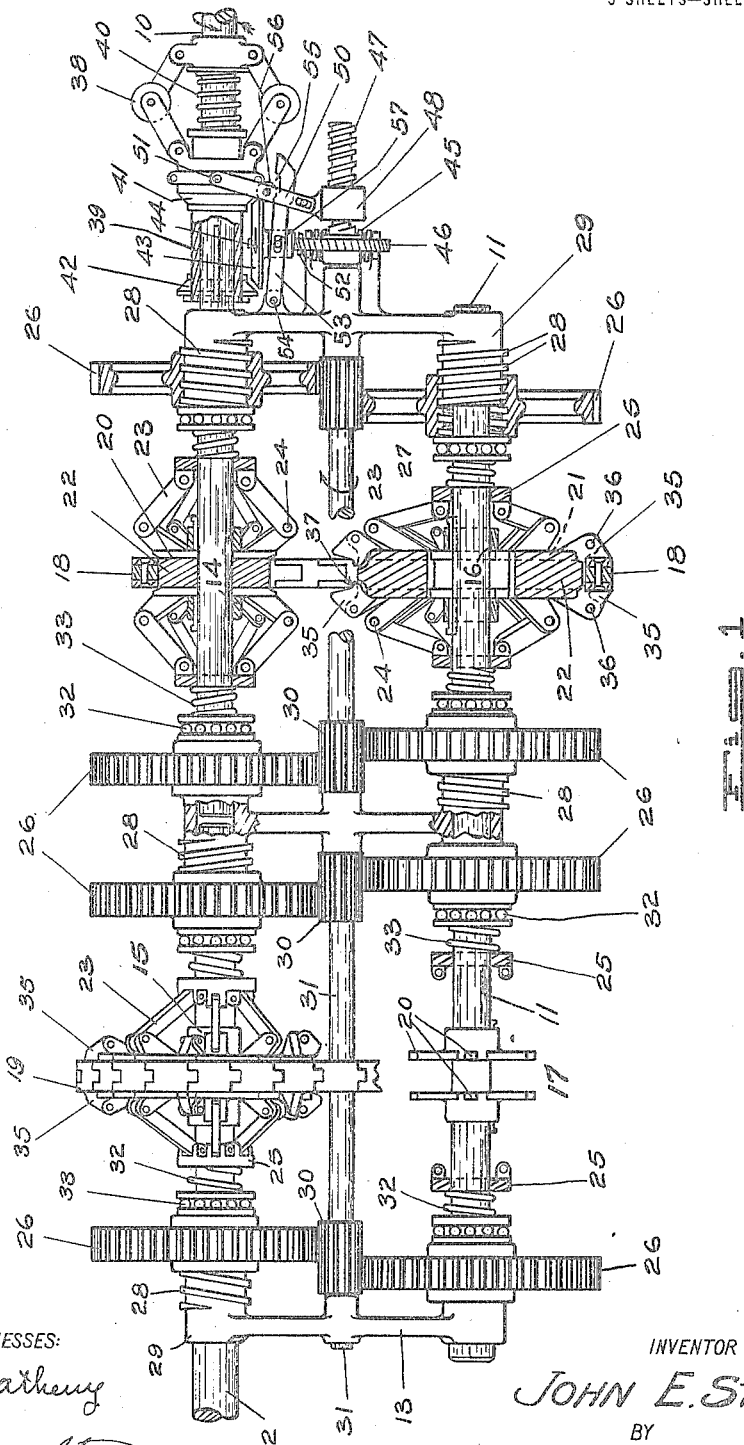

JOHN E. STYERS, OF SEATTLE, WASHINGTON.

AUTOMATIC SPEED-CHANGING MECHANISM.

1,291,241.  Specification of Letters Patent.  Patented Jan. 14, 1919.

Application filed February 19, 1917. Serial No. 149,954.

*To all whom it may concern:*

Be it known that I, JOHN E. STYERS, a citizen of the United States, residing at Seattle, in the county of King and State of Washington, have invented a new and useful Improvement in Automatic Speed-Changing Mechanism, of which the following is a specification.

This invention relates to improvements in variable speed automatic power transmissions and the object of this improvement is to provide a power transmission that may be interposed between a driving and a driven shaft and is adapted to automatically vary the gear ratio between the two shafts in response to a change in the speed of rotation of the two shafts that may be brought about by increasing or decreasing the load on the shafts.

The device is designed especially for use on motor vehicles and is adapted to be interposed in the shaft line that connects the engine with the differential thereby serving to take the place of the sliding gear or other change speed mechanism commonly used.

The transmission mechanism includes a governor that is sensitive to a change of speed of rotation of the driving shaft and automatically acts on the mechanism that transmits the power to vary the gear ratio.

It is a well known fact that the maximum efficiency of an engine is obtained at a certain predetermined speed and that when such engine is turning at a greater or less speed its efficiency is reduced. This transmission is so constructed as to automatically vary the gear ratio between the engine drive shaft and the driven shaft that connects with the differential when the speed of the engine exceeds or falls below certain predetermined limits of speed. For instance if the speed of maximum efficiency of the engine lies between 950 and 1100 revolutions per minute then this transmission will be so adjusted as to increase the gear ratio or shift to lower gear when the speed of the engine falls below 950 revolutions per minute and to reduce the gear ratio or shift to higher gear when the speed of the engine exceeds 1100 revolutions per minute.

The invention consists in the novel construction, adaptation, and combination of parts as will be more clearly described in the following specification, illustrated in the accompanying drawings and finally pointed out in the appended claims.

In the accompanying drawings Figure 1 is a plan view of a transmission constructed in accordance with this invention certain parts being broken away to more clearly reveal the construction of other parts; Fig. 2 is a view in end elevation of the device shown in Fig. 1; Fig. 3 is fragmentary plan view illustrating a variation in the form of construction of expansible pulleys embodied in the invention; Fig. 4 is an enlarged plan view of one of the pulleys constructed in accordance with this invention; Fig. 5 is a sectional view on broken line 5, 5 of the pulley shown in Fig. 4 and Fig. 6 is a view in elevation of one of the cone shaped members.

Referring to the drawings throughout which like reference numerals indicate like parts the numeral 10 indicates a driving shaft that may be connected with an engine, 11 indicates a counter shaft and 12 indicates a driven shaft that may be connected with the differential of a motor vehicle.

The shafts 10, 11 and 12 are journaled in a suitable frame work 13 which may take the form of a gear box on a motor car if desired.

14 is an expansible pulley that is secured on the drive shaft, 15 is a similar pulley that is secured on the driven shaft and 16 and 17 are similar pulleys that are secured on the counter shaft at points directly opposite the pulleys 14 and 15 respectively.

18 is a chain that is disposed on the pulleys 14 and 16 and 19 is a similar chain that is disposed on the pulleys 15 and 17 so that when the drive shaft 10 is rotated the chain 18 will drive the counter shaft 11 and the chain 19 will drive the driven shaft 12.

It is obvious that by varying the effective working diameters of the several pulleys the gear ratio between the drive shaft 10 and driven shaft 11 may be varied.

The structure of the four pulleys 14, 15, 16 and 17 is identical, each of such pulleys consisting of hub members having integrally formed radial guides 20 that are spaced apart to fit within slots 21 in wheel expansion sections 22 that are movable radially of the wheel and serve as a support for the links of the encircling chains to lie upon in any expanded or contracted position.

The expansion sections 22 are moved radially of the pulleys by links 23 pivoted as at 24 to integral lugs on the sections 22 and articulated at their outer ends with slidable collars 25 on the respective shafts.

As the collars 25 are moved toward the hub of the pulleys the sections 22 are moved outward radially of the pulleys and the pulleys are expanded and as the collars are moved away from the hubs of the wheels the sections are moved radially inward and the pulleys are contracted.

The collars 25 are moved endwise on their respective shafts by gear wheels 26 whose hub portions are threaded as at 27 and adapted to screw onto worms or screw threads 28 on studs 29 that are fixedly secured to the frame.

One of the gear wheels 26 is disposed at each end of each pulley and such wheels are mounted on left and right hand threads respectively so that when both wheels are turned in the same direction they will both move toward or away from the pulley located therebetween.

The gear wheels 26 on the counter shaft 12 are located substantially opposite the gear wheels on the drive shaft 10 and driven shaft 11 and are each threaded on oppositely directed threads; for instance if the gear to the right hand side of the pulley 14 on the drive shaft, as viewed in Fig. 1, is mounted on a left hand thread then the gear to the right hand side of the pulley 16 is mounted on a right hand thread.

The gear wheels 26 are rotated on their threaded hubs by pinions 30 on a shaft 31 that is journaled in the frame 13 and rotated as hereinafter described.

The pinions 30 each engage two oppositely disposed gear wheels and are of sufficient length so that the gear wheels will not move past their ends when such gear wheels are moved lengthwise with respect to the pinions.

Ball bearings 32 and compression springs 33 are interposed between the hubs of the gear wheels 26 and the collars 25 and serve to transmit the thrust from the hubs of the gear wheels 26 to the pulleys. The ball bearings 32 are herein illustrated somewhat diagrammatically.

From the above description it is obvious that when the shaft 31 is rotated in one direction the pulley 14 will be contracted, the pulley 16 will be expanded, the pulley 17 will be contracted and the pulley 15 will be expanded and when the shaft 31 is rotated in the opposite direction the contracting and expanding of the several pulleys will be directly opposite.

35 are cams that are disposed in pairs on opposite sides of the expansion members 22 and pivoted as at 36 so that they will grasp and hold the chains 18 or 19 as they take onto the wheels, and easily release such chains as they leave the wheels.

The inner bottom portions of the cams 35 are provided with shoulders 37 that are adapted to be engaged by the inner face of the chain thus insuring that the cams will grasp the side of the chain and the centers of gravity of the cams are located at an angle to the radius of rotation of the wheels so that the cams will always stand outward as shown on one side of the pulley 16, Fig. 1, when the cams are not in engagement with the chains.

38 is a parabolic governor that is mounted on the driving shaft 10 to rotate therewith and is connected with a slidable sleeve 39 that operates against a compression spring 40.

The sliding sleeve 39 is splined to the shaft 10 and is provided with two cone shaped friction gears 41 and 42 that are adapted in their turn and when the sleeve 39 is in certain positions to engage opposite sides of a friction disk 43 it being impossible for both of the friction gears 41 and 42 to engage the disk 43 at the same time.

The disk 43 is mounted on a shaft 44 that is suitably journaled in the frame and carries a worm 45 that engages a worm wheel 46 on the shaft 31 so that the shaft 31 may be rotated by turning the disk 43.

The end of the shaft 31 is threaded as at 47 and has a nut or collar 48 screwed thereon.

The nut 48 is pivotally connected by a slot and pin connection with one end of a yoke 50 whose other end is connected by a pivot 51 with the sliding governor sleeve 39.

52 is a compression spring that tends to hold the disk 43 outwardly in contact with the friction gears 41 and 42 and 53 is a lever arm having one end pivoted as at 54 to a fixed support and its other end provided with a notch 55 for the engagement of a roller 56 in the yoke 50.

The lever arm 53 extends crosswise of the shaft 44 and is connected by a slot and pin connection 57 with the shaft 44 or disk 43 in such manner that the disk 43 may be moved toward or away from the friction gears 41 and 42 without interfering with the rotation of such shaft.

Fig. 1 shows the mechanism in the low gear position. As the speed of the driving shaft increases the governor sleeve 39 will be moved toward the right and the roller 56 will be moved opposite the slot 55 in the lever arm 53 and will permit such lever arm and the friction disk 43 to move toward the driving shaft until the disk 43 engages the friction gear 42 and is rotated thereby thus rotating the shaft 44 which acts through the worm 45 and worm wheel 46 to rotate the shaft 31, the direction of rotation of the several parts being indicated by arrows. The rotation of the shaft 31 will expand pulleys 14 and 17 and contract pulleys 16 and 15 thus lessening the gear ratio or shifting to a higher gear.

When the shaft 31 rotates as indicated the nut 48 will be moved outwardly on the screw thread 47 until the roller 56 engages the outer inclined end of the notch 55 and by moving over such surface moves the outer end of the lever arm 53 away from the driving shaft 10 and withdraws the friction disk 43 from engagement with the friction gear 42 thereby stopping the rotation of the shaft 44.

As the speed of rotation of the driving shaft 10 decreases after a high speed has been attained the sleeve 39 will move to the left and the roller 56 will again move opposite the notch 55 thus permitting the friction disk 43 to drop into engagement with the friction gear 41 and rotate the shaft 44, worm 45, worm wheel 46, shaft 31 and gear wheels 26 in a direction opposite to that indicated by the arrows thus contracting pulleys 14 and 17 and expanding pulleys 16 and 15.

In Figs. 3 to 6 inclusive I have illustrated a form of expansion pulleys that are preferable to the forms shown in Fig. 1 for the reason that they are more compact and will occupy less space.

These pulleys each comprise two cone shaped members 60 that are splined onto their shafts and are formed on their smaller ends with alternate recesses and prongs 61 and 62 respectively whereby they are adapted to telescope into each other so that the circumference measured on the line of their intersecting planes will be increased as the cones are moved toward each other and decrease as the cones are moved away from each other.

Two of the cone members 60 form a pulley and the pulleys are arranged in the same manner as the pulleys 14, 15, 16 and 17 shown in Fig. 1 and are connected with the same mechanism for moving the cones lengthwise of the shafts that the collars 25 of Fig. 1 are connected with.

63 are chains that normally ride on the peripheries of the cones 60 at the point of intersection thereof such chains being held to prevent slipping by cams 64 that are of similar shape to the cams 35 and are pivoted in angular saddles 65 that lie within recesses 66 in the cone members so that they are flush with the surface thereof.

The recesses 66 are L shaped in cross section and are formed in the edges of two adjacent prongs 62 so that the saddles 65 lie half within each prong and slide within the recesses as the cone members are moved toward or away from each other.

The saddles may be secured to the cone shaped members by pins 67 located at the vertex of each saddle and projecting within the L shaped slots 66.

Two of the saddles 65 will preferably be used on each pulley although in some instances it may be desirable to use a greater number.

It is understood that the scope of this invention is not limited to the exact constructions shown and described but that changes in the form of mechanism used to perform the various functions may be resorted to within the scope of the appended claims.

What I claim and desire to protect by Letters Patent is:

1. The combination with a motor vehicle having a driving shaft and a driven shaft of a power transmission connecting said two shafts, said power transmission comprising a series of pulleys of adjustable diameters that are connected with each other by driving chains, means for varying the relative diameters of said pulleys to vary the gear ratio between said two shafts and a governor on said driven shaft to automatically operate said pulley diameter varying means in response to a change in the velocity of rotation of said driving shaft.

2. The combination with a motor vehicle having a driving shaft and a driven shaft, of a power transmission connecting said two shafts said transmission comprising a series of pulleys of adjustable diameters arranged in pairs, chains connecting the pulleys of each pair, cams on said pulleys for engaging and holding said chains, means for varying the relative diameters of said pulleys, whereby when the diameter of one pulley is increased the diameter of the opposite pulley will be decreased, and governor mechanism on said driven shaft for automatically operating said pulley diameter varying means in response to a change in the velocity of rotation of said driving shaft.

3. The combination with a driving shaft and a driven shaft, of pulleys of adjustable diameters on each of said shafts, a counter shaft, pulleys of adjustable diameters on said counter shaft opposite each of said first named pulleys, chains connecting said pulleys on said driven shaft and said drive shaft respectively with said oppositely disposed pulleys on said counter shaft, means for adjusting the diameters of all of said pulleys simultaneously to vary the gear ratio between said driving shaft and said driven shaft and a governor on said driving shaft to automatically control said pulley adjusting means.

4. The combination with a driving shaft and a driven shaft of pulleys of adjustable diameters on each of said shafts, a counter shaft, pulleys of adjustable diameters on said counter shaft opposite said first named pulleys, drive chains connecting oppositely disposed pulleys respectively, means for adjusting the diameters of all of said pulleys simultaneously said means comprising collars slidable on said shafts, fixedly supported worms, gear wheels having threaded hub portions that screw onto said worms and engage with said collars, means for turning all of said gear wheels simultaneously, a governor on said driving shaft, and mechanism connected with said governor for actuating said gear wheel turning means in response to a variation in the speed of rotation of said driving shaft to vary the relative diameters of said pulleys.

5. The combination with a driving shaft and a driven shaft, of pulleys of adjustable working diameters, mounted on each of said shafts, a counter shaft, pulleys of adjustable working diameters mounted on said counter shaft opposite said first named pulleys, chain engaging cams on all of said pulleys, a chain connecting one of said counter shaft pulleys with said driving shaft pulley, another chain connecting said other counter shaft pulley with said driven shaft pulley, means for varying the diameters of all of said pulleys simultaneously said means comprising collars slidable on said shafts toward and away from said pulleys, worms fixedly mounted in the line of said shafts, gear wheels having hub portions adapted to screw onto said worms and engage said collars said gear wheels being located one on each side of each of said pulleys, pinions to mesh with and turn said gear wheels simultaneously, a shaft for said pinions, a parabolic governor on said driving shaft, and means automatically actuated by said governor for rotating said pinion shaft.

6. The combination with a driving shaft and a driven shaft, of pulleys having adjustable working diameters mounted on each of said shafts, each of said pulleys comprising two cone shaped members slotted on their smaller ends to interfit so that when they are moved toward and away from each other their diameter on the line of their intersecting surfaces will be varied, drive chains passing over said pulleys, a governor on said driving shaft and means connected with said governor for automatically adjusting the relative diameters of said pulleys.

Signed by me at Seattle, Washington, this 6th day of February, 1917.

JOHN E. STYERS.

Witnesses:
  E. B. HERALD,
  F. C. MATHENY.